(12) United States Patent
Dieterich

(10) Patent No.: US 12,407,229 B2
(45) Date of Patent: Sep. 2, 2025

(54) METHOD FOR PRODUCING AN INTERMEDIATE PRODUCT FOR AN ELECTRICAL MACHINE, COMPRISING A STATOR LAMINATED CORE AND A HOUSING PART, CONNECTED THERETO, OF THE HOUSING

(71) Applicant: Valeo eAutomotive Germany GmbH, Erlangen (DE)

(72) Inventor: Sebastian Dieterich, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 275 days.

(21) Appl. No.: 18/006,322

(22) PCT Filed: Jul. 21, 2021

(86) PCT No.: PCT/EP2021/070415
§ 371 (c)(1),
(2) Date: Jan. 20, 2023

(87) PCT Pub. No.: WO2022/018151
PCT Pub. Date: Jan. 27, 2022

(65) Prior Publication Data
US 2023/0291293 A1    Sep. 14, 2023

(30) Foreign Application Priority Data

Jul. 23, 2020   (DE) .................... 10 2020 119 442.0

(51) Int. Cl.
*H02K 15/14*   (2025.01)
*H02K 5/06*    (2006.01)
*C22C 21/02*   (2006.01)

(52) U.S. Cl.
CPC ............... *H02K 15/14* (2013.01); *H02K 5/06* (2013.01); *C22C 21/02* (2013.01)

(58) Field of Classification Search
CPC .......... H02K 15/14; H02K 5/06; H02K 5/203; H02K 15/02; C22C 21/02
(Continued)

(56) References Cited

U.S. PATENT DOCUMENTS 2,711,492 A * 6/1955 Ballman ................ H02K 1/185
164/109
2018/0248439 A1   8/2018  Mcgrew, Jr. et al.
2021/0143704 A1   5/2021  Schwanemann et al.

FOREIGN PATENT DOCUMENTS

CN   110932506 A   *  3/2020
DE      767 429 A      7/1952
(Continued)

OTHER PUBLICATIONS

CN110932506A English translation (Year: 2024).*
(Continued)

Primary Examiner — Christopher M Koehler
Assistant Examiner — Viswanathan Subramanian
(74) Attorney, Agent, or Firm — Oblon, McClelland, Maier & Neustadt, L.L.P.

(57) ABSTRACT

A method for producing an intermediate product for an electrical machine includes supplying a mould for a housing part. A stator laminated core is laid inside the mould and the housing part is produced by introducing a molten metal alloy into the mould. The molten metal alloy comes directly into contact with the stator laminated core. The method relates to an electrical machine with such an intermediate product, and a vehicle with such an electrical machine.

9 Claims, 6 Drawing Sheets

(58) Field of Classification Search
USPC .......................................................... 310/216
See application file for complete search history.

(56) References Cited

FOREIGN PATENT DOCUMENTS

| | | |
|---|---|---|
| DE | 10 2009 000 591 A1 | 8/2010 |
| DE | 10 2014 217 434 A1 | 3/2016 |
| DE | 10 2018 103 478 A1 | 8/2018 |
| DE | 10 2018 110 176 A1 | 10/2019 |
| EP | 3 373 421 B1 | 11/2019 |
| EP | 3 628 550 A1 | 4/2020 |
| WO | WO 2008/145190 A1 | 12/2008 |

OTHER PUBLICATIONS

DE102009000591A1 English translation (Year: 2024).*
International Preliminary Report on Patentability and Written Opinion issued Feb. 2, 2023, in PCT/EP2021/070415, 8 pages.
International Search Report and Written Opinion issued Oct. 27, 2021 in PCT/EP2021/070415, filed on Jul. 21, 2021, 3 pages.
Office Action issued Jun. 21, 2021, in corresponding German Patent Application No. 10 2020 119 442.0 (with English Translation of Category of Cited Documents), 15 pages.

* cited by examiner

METHOD FOR PRODUCING AN INTERMEDIATE PRODUCT FOR AN ELECTRICAL MACHINE, COMPRISING A STATOR LAMINATED CORE AND A HOUSING PART, CONNECTED THERETO, OF THE HOUSING

TECHNICAL FIELD

The invention relates to a method for producing an intermediate product for an electrical machine, specifically an intermediate product which comprises a stator laminated core and a housing part, connected thereto, of a housing of the electrical machine. Furthermore, an electrical machine with such an intermediate product, and a vehicle with such an electrical machine, are specified.

PRIOR ART

In electrical machines, it is known to press the stator laminated core into a housing part of the housing. In this case, the problem of a fit between said parts changing when they are not produced from the same material arises, particularly given a large range in respect of the use or operating temperature of the electrical machine. This is the case, for example, when the stator laminates of the stator laminated core consist of steel but the housing part consists of an aluminium alloy. Since aluminium expands to a greater extent than steel, the press fit becomes weaker upon heating of the electrical machine and becomes stronger upon cooling. In this respect, the problem that the stator laminated core slips through, that is to say undesired relative rotation occurs between the stator laminated core and the housing part, arises upon heating. The problem that the stator laminated core, under certain circumstances, pushes onto the housing part so powerfully that said housing part breaks arises once again upon cooling. The wall thickness of the housing part therefore has to be selected such that this does not happen, as a result of which the weight of the electrical machine is increased. Particularly when said electrical machine is used in a vehicle, this is a highly disadvantageous effect. In general, it is also disadvantageous that both the inner side of the housing part and also the outer side of the stator laminated core have to be produced with very small tolerances, with the result that the press fit between the stator laminated core and the housing part exhibits reproducible properties. In the given context, it is also conceivable to seek out suitable pairs from a large number of stator laminated cores and housing parts by measuring the inside diameter of the housing part and the outside diameter of the stator laminated core, this likewise requiring a great deal of effort.

It is also known to screw the stator laminated core to the housing. In this case too, establishing the connection between the stator laminated core and the housing requires a great deal of effort and it is necessary to provide a fit, even though less stringent demands may be placed on this fit.

DISCLOSURE OF THE INVENTION

An object of the invention is therefore to provide an improved intermediate product, an improved electrical machine and an improved vehicle. In particular, it is intended that the intermediate product is produced with relatively little technical effort and that preferably prevention of relative rotation between the stator laminated core and the housing part is enabled.

The object of the invention is achieved by a method for producing an intermediate product for an electrical machine, said method comprising the following steps:
supplying a mould for a housing part,
laying a stator laminated core inside the mould, and
producing the housing part by introducing a molten metal alloy into the mould, wherein the molten metal alloy comes directly into contact with the stator laminated core.

The stator laminated core is produced, for example, by
manufacturing a plurality of stator laminates, and
stacking this plurality of stator laminates to form a stator laminated core.

This can, however, take place in a separate manufacturing step, as a result of which the stator laminated core is also supplied as an intermediate product for the subsequent casting.

The metal alloy is preferably an aluminium alloy. The metal alloy can also be a magnesium alloy, in particular a magnesium die casting alloy.

In all, the method for producing an intermediate product can thus have the following steps:
manufacturing a plurality of stator laminates,
stacking this plurality of stator laminates to form a stator laminated core,
supplying a mould for the housing part,
laying the stator laminated core inside the mould, and
producing the housing part by introducing a molten metal alloy, in particular a molten aluminium alloy or a molten magnesium alloy, into the mould, wherein the molten metal alloy comes directly into contact with the stator laminated core.

The object of the invention is also achieved by an electrical machine which comprises
a housing with a housing part,
a stator, arranged in the housing, with a stator laminated core, and
a rotor which is arranged in the housing and is mounted rotatably therein (with the aid of bearings arranged in the housing), wherein
the intermediate product produced according to the above method is part of the said housing and part of the said stator, and wherein the stator laminated core is cast with the housing part.

Finally, the object is also achieved by a vehicle with at least two axles, at least one of which is driven, wherein the said driving action is performed at least partially or for part of the time by the abovementioned electrical machine.

By means of the proposed measures, the disadvantages cited initially may be overcome. In particular, the proposed method enables the production of the intermediate product with little technical effort with at the same time a low weight of the electrical machine and with at the same time relative rotation between the stator laminated core and the housing part being avoided even in the case of a large range of the use or operating temperature of the electrical machine, as occurs in particular in the case of use in a vehicle. In particular, temperatures of approximately −40° C. to +100° C. or even greater than 180° C. can occur here. In this respect, use of the intermediate product in an electrical machine for or in a vehicle is particularly advantageous. Producing a fit between the stator laminated core and the housing part is generally not necessary.

In the case of an aluminium alloy as the metal alloy, it can preferably have a content of at least 2% Si and/or 1% Mg.

In this way, advantageous properties can be achieved both during the casting and in terms of the strength of the housing part.

Further advantageous embodiments and developments of the invention can be found in the dependent claims and in the description considered in conjunction with the figures.

It is favourable if the stator laminated core comes directly into contact with the molten metal alloy only at the circumference. In this way, the housing part can be formed simply.

It is, however, also advantageous if the stator laminated core comes directly into contact with the molten metal alloy at the circumference and at an annular region of a first covering surface of the stator laminated core which is formed by a first stator laminate of the stator laminated core. It is furthermore particularly advantageous if the stator laminated core additionally directly comes into contact with the molten metal alloy at an annular region of a second covering surface of the stator laminated core which is formed by a last stator laminate of the stator laminated core. In this way, the stator laminated core can be secured axially on one side or on two sides.

It is also advantageous if a circumferential deviation of the stator laminated core from an ideal cylindrical shape and/or a circumferential surface roughness of the stator laminated core is at least 0.1 mm. In this way, a particularly good form fit can be obtained between the stator laminated core and the housing part because the molten metal, in particular the molten aluminium or the molten magnesium, penetrates the circumferential notches or indentations and becomes stuck there. In particular, the stator laminated core can for this purpose have grooves which run in an axial direction or in a helix.

It is also particularly advantageous if the molten metal alloy penetrates between the stator laminates of the stator laminated core. As a result, the form fit between the stator laminated core and the housing part is further improved. This effect occurs especially when the outer edges of the stator laminates are rounded or bevelled.

It is generally advantageous if the outer edges of the stator laminates are kept relatively rough so that they have a sort of microserration. For example, such microserration can be achieved by stamping burrs not being removed or not being provoked at all. If the stator laminates are laser or plasma cut, such serration can be achieved by corresponding activation of the laser or plasma beam. The stator laminates are then simultaneously toothed wheels with very fine serrations. It would, for example, also be conceivable to knurl the stator laminated core.

It is furthermore advantageous if the stator laminated core has a temperature of between 10° C.-40° C., preferably between 15°–25° C., before the molten metal alloy is introduced into the mould. This is in particular favourable if the electrical machine is more likely to be operated in a low temperature range because upon cooling of the electrical machine the stator laminated core does not push too powerfully onto the housing part and the latter can consequently have a thin-walled design. It is, however, also favourable if the stator laminated core is heated to a temperature of 40°–180° C. before the molten metal alloy is introduced into the mould. This is advantageous if the electrical machine is more likely to be operated in a high temperature range. As a result, the stator laminated core does not become loose in the housing part even when the electrical machine is heated, and relative rotation between the stator laminated core and the housing part can be avoided effectively.

The above embodiments and developments of the invention may be combined in an arbitrary fashion.

BRIEF DESCRIPTION OF THE FIGURES

The present invention is explained in more detail below with reference to the exemplary embodiment shown in the schematic figure of the drawings. In the drawings.

DETAILED DESCRIPTION OF THE INVENTION

It should be noted at this point that identical parts in the different embodiments are provided with the same reference signs or the same component designations, in some cases with different indices. The disclosures of a component contained in the description may accordingly be transferred to another component with the same reference sign or the same component designation. Also, the positional data selected in the description, such as for example "top", "bottom", "rear", "front", "side" etc. relate to the figure directly described and illustrated, and in the event of a change in position, should be transferred accordingly to the new position.

Figure 1:
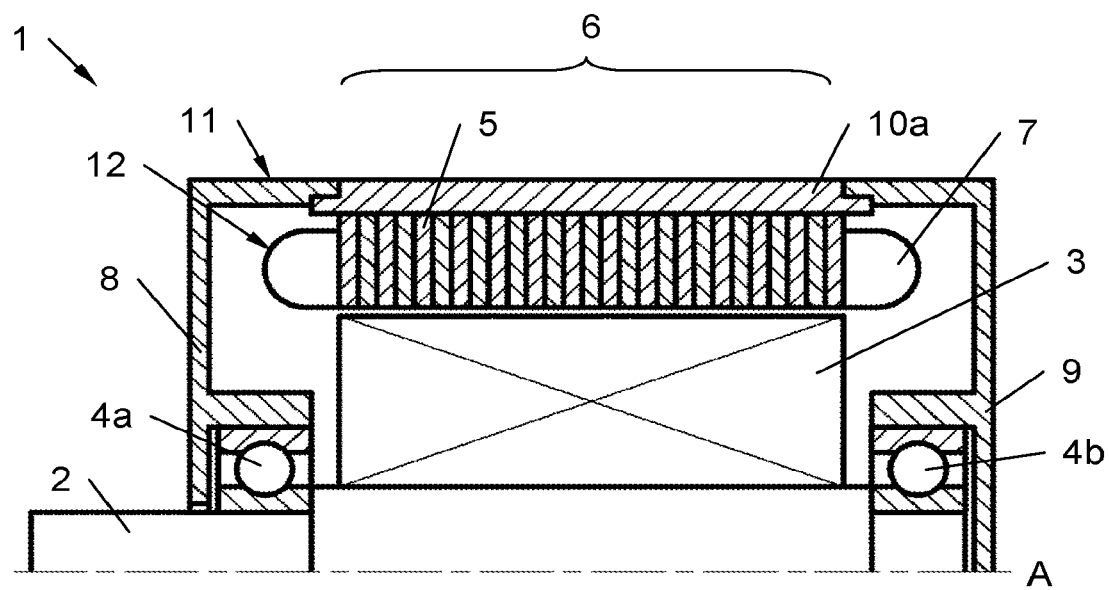
FIG. 1 shows a schematic half-sectional view of an exemplary electrical machine.

FIG. 1 shows a half-section through a schematically illustrated electrical machine 1. The electrical machine 1 comprises a shaft 2 with a rotor 3 sitting thereon, wherein the shaft 2 is mounted by means of (roller) bearings 4a, 4b so as to be rotatable relative to a stator about a rotational axis A. In this example, the stator has a stator laminated core 6, comprising a plurality of stator laminates 5, and stator windings 7 arranged therein. Specifically, the first bearing 4a sits in a front end plate 8, and the second bearing 4b sits in a rear end shield 9. Furthermore, the electrical machine 1 comprises a (middle) housing part 10a which connects the front end shield 8 and the rear end shield 9 and also accommodates the stator laminated core 6. The front end shield 8, the rear end shield 9 and the housing part 10a in this example thus form the housing 11 of the electrical machine 1, the stator laminated core 6 with the stator windings 7 of its stator 12.

Figure 2:
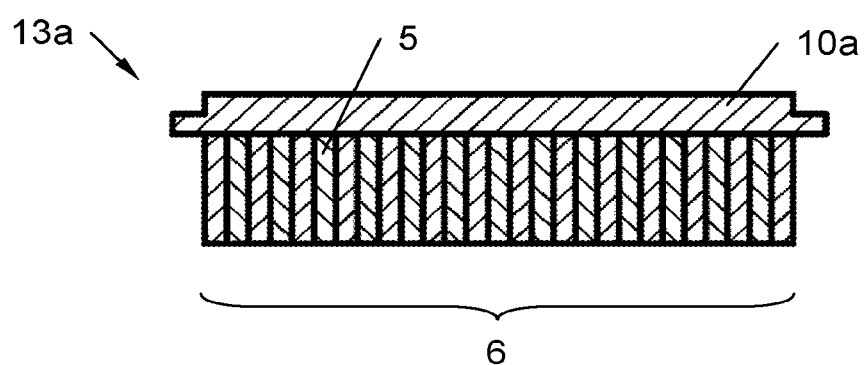
FIG. 2 shows a first example for an intermediate product for the electrical machine.

FIG. 2 shows an upper part of the stator laminated core 6 and the housing part 10a which together form an intermediate product 13a in the production of the electrical machine 1, in an isolated illustration.

The production of the intermediate product 13a is now illustrated schematically with the aid of FIGS. 3 to 9: In a first step, not illustrated explicitly, a plurality of stator laminates 5 are produced (for example, stamped or laser cut) and stacked in a second step to form a stator laminated core 6.

Figure 3:
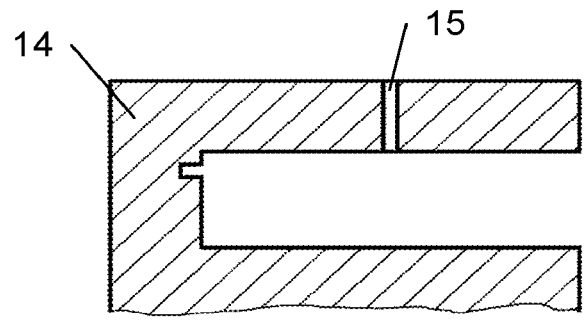
FIGS. 3-9 show manufacturing steps in the production of the intermediate product.
Figure 4:
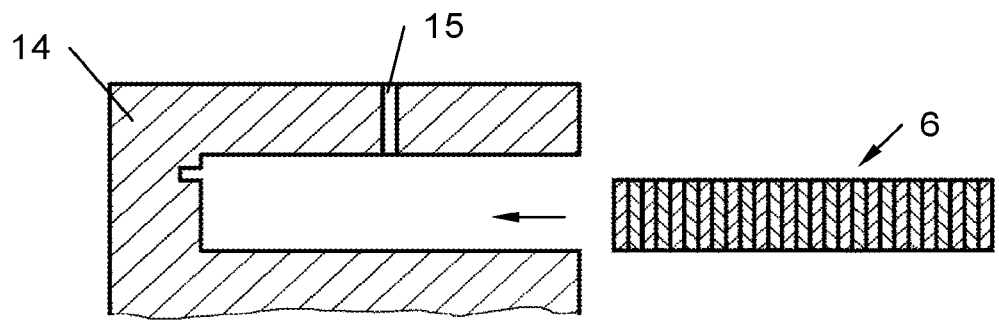
Figure 5:
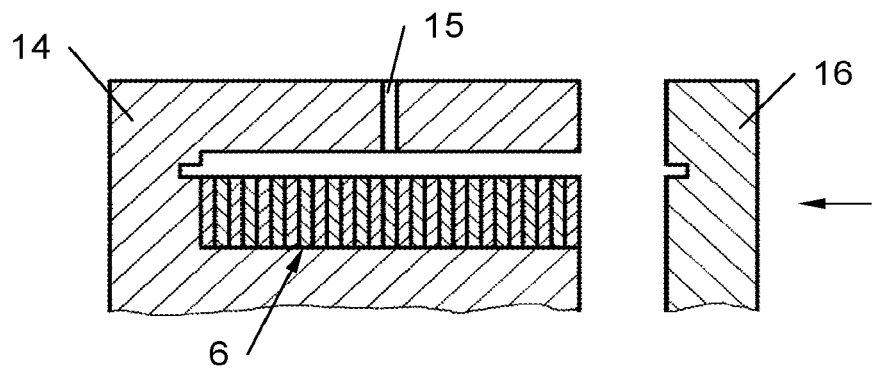
Figure 6:
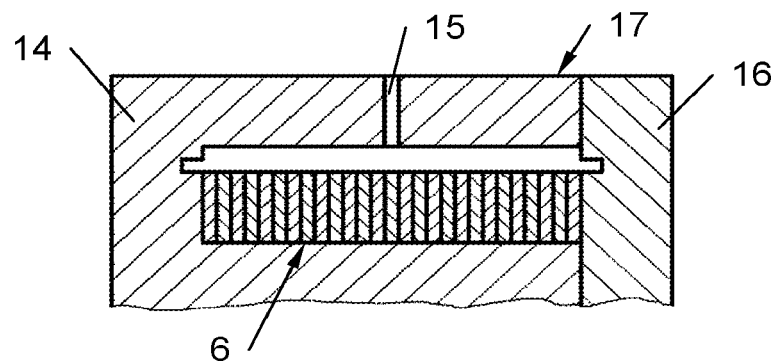
Figure 7:
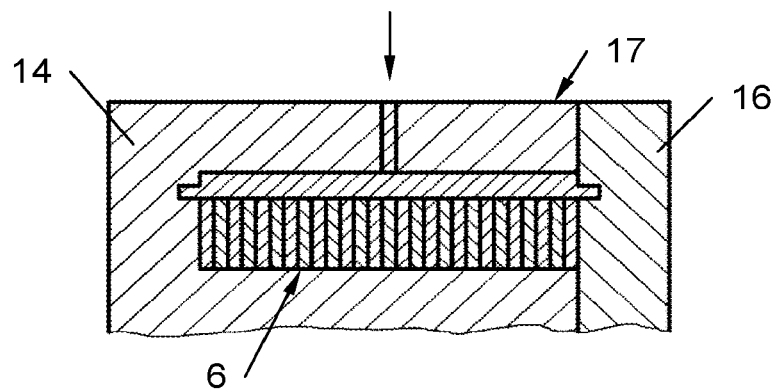
Figure 8:
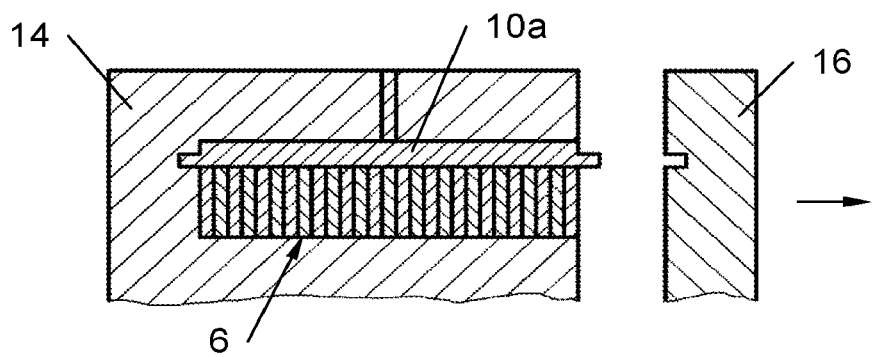
Figure 9:
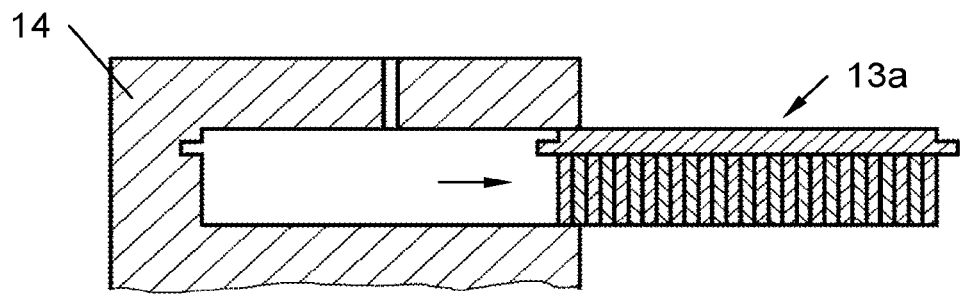

In a further step illustrated in FIG. 3, a mould is supplied for the housing part 10a. Only a first mould part 14, which has a feed duct 15, is illustrated here in FIG. 3. Here too, only the upper part of the first mould part 14 is illustrated in section. In a further step illustrated in FIG. 4, the stator laminated core 6 is laid inside the first mould part 14 of the mould. In a further step illustrated in FIG. 5, a second mould part 16 of the mould is moved towards the first mould part 14, wherein the stator laminated core 6 is already situated in the first mould part 14. In a further step illustrated in FIG. 6, the mould is closed. The (whole) mould is designated with the reference sign 17 in FIG. 6. In a further step illustrated in FIG. 7, a molten aluminium alloy, generally a molten metal alloy, is introduced into the mould 17 via the feed duct 15. The molten aluminium alloy here comes directly into contact with the stator laminated core 6. In a further step illustrated in FIG. 8, the mould 17 is opened after the molten aluminium which now forms the housing part 10a hardens. Lastly, the intermediate product 13a is removed from the mould 17 in a step illustrated in FIG. 9. In a further step which is not illustrated, the stator windings 7 can be attached, after which the resulting arrangement can be used for further assembly of the electrical machine 1. It should be noted at this point that the stator laminated core 6 can be pressed together in the axial direction by closing the mould 17 or by other measures such that the stator laminates 5 bear closely against one other when they come into contact with the molten aluminium. A magnesium alloy can, for example, also be used as the metal alloy.

Figure 10:
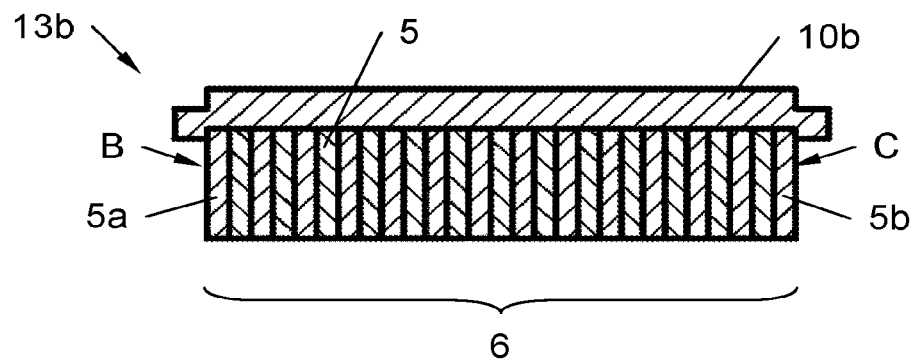
FIG. 10 shows an example of an intermediate product in which the stator laminated core is secured axially on two sides in the housing part.

In the case of the intermediate product 13a illustrated in FIG. 2, the production of which is illustrated with the aid of FIGS. 3 to 9, the stator laminated core 6 comes directly into contact with the molten aluminium alloy or with the housing part 10a only at the circumference. However, this is not the only foreseeable option. It is also conceivable that the stator laminated core 6 comes directly into contact with the molten aluminium alloy at the circumference and at an annular region of a first covering surface B of the stator laminated core 6 which is formed by a first stator laminate 5a of the stator laminated core, as is illustrated in FIG. 10 for the intermediate product 13b. In addition, the stator laminated core 6 can come directly into contact with the molten aluminium alloy at an annular region of a second covering surface C of the stator laminated core 6 which is formed by a last stator laminate 5b of the stator laminated core 6, as is likewise illustrated in FIG. 10 for the intermediate product 13b. In this way, the stator laminated core 6 is secured axially particularly well. Contact with the molten aluminium at only one of the covering surfaces B, C is possible. The stator laminated core 6 is then secured axially on just one side.

Figure 11:
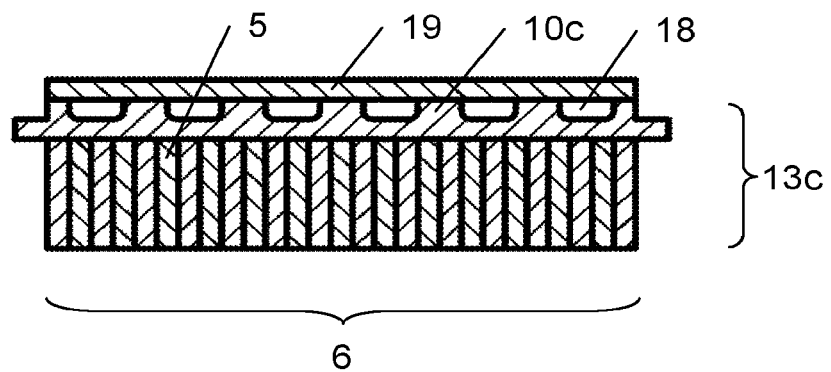
FIG. 11 shows an example of an intermediate product with cooling ducts.

FIG. 11 shows a further exemplary embodiment of an intermediate product 13c in which cooling ducts 18, which are closed by fitting an outer and separately produced housing part 19, are cast in the housing part 10c. It would, of course, also be possible that the cooling ducts 18 are provided in the outer housing part 19. The arrangement illustrated in FIG. 11 can, after attachment of the stator windings 7, be used in turn for further assembly of the electrical machine 1. It should be noted at this point that it can also be provided here that the stator laminated core 6 comes into contact with the molten aluminium at the first covering surface B and possibly also at the second covering surface C.

In order to control temperature-related mechanical stresses which occur within the intermediate product 13a . . . 13c within the operating range of the electrical machine 1 (for example, −40° C. to +180° C.), the stator laminated core 6 can have a certain temperature before the molten aluminium alloy is introduced into the mould 17. In particular, the temperature of the stator laminated core 6 can be between 15°–25° C. before the molten aluminium alloy is introduced into the mould 17. This is favourable in particular when the electrical machine 1 is more likely to be operated in a low temperature range. It is, however, also favourable if the stator laminated core 6 is heated to a temperature of 50°–150° C. before the molten aluminium alloy is introduced into the mould 17. This is advantageous if the electrical machine 1 is more likely to be operated in a high temperature range.

Figure 12:
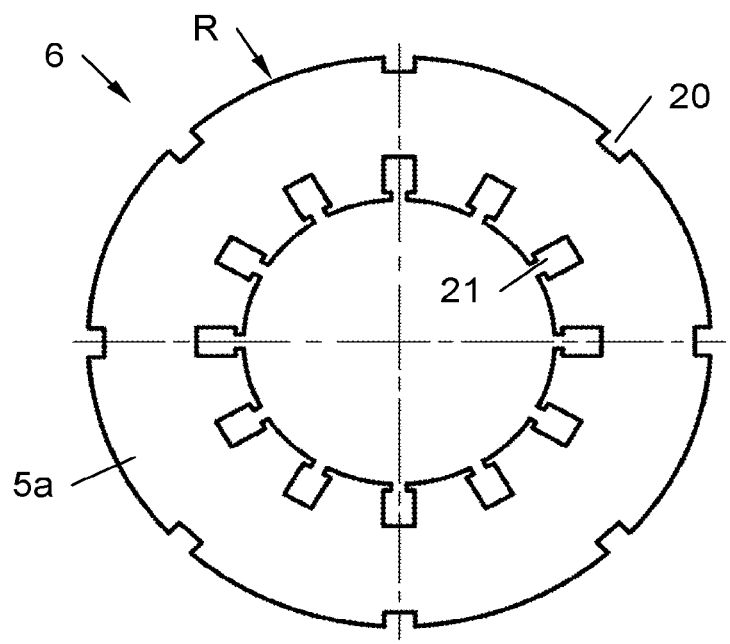
FIG. 12 shows a front view of an exemplary stator laminated core.

A form fit is generally formed between the stator laminated core 6 and the housing part 10a . . . 10c by the proposed measures. This can be improved if the stator laminated core 6 deviates from an ideal cylindrical shape at the circumference. It is in particular advantageous if a circumferential deviation of the stator laminated core 6 from an ideal cylindrical shape is at least 0.1 mm. It is also particularly advantageous if a circumferential surface roughness of the stator laminated core 6 is at least 0.1 mm. FIG. 12 shows a front view of an example of a stator laminated core 6 which has a plurality of circumferential grooves 20 which can run in an axial direction or also, for example, helically and into which the molten aluminium can penetrate. As a result, the form fit between the stator laminated core 6 and the housing part 10a . . . 10c is improved and relative rotation between them is effectively avoided. The stator laminated core 6 also has internal grooves 21 which receive the stator windings 7. In addition to the circumferential grooves 20 or as an alternative thereto, the circumferential surface roughness R can be at least 0.01 mm. It is therefore favourable to form the stator laminated core 6 so that it is not completely smooth at the circumference so that the molten aluminium can cling well to the notches and indentations of the stator laminated core 6.

Figure 13:
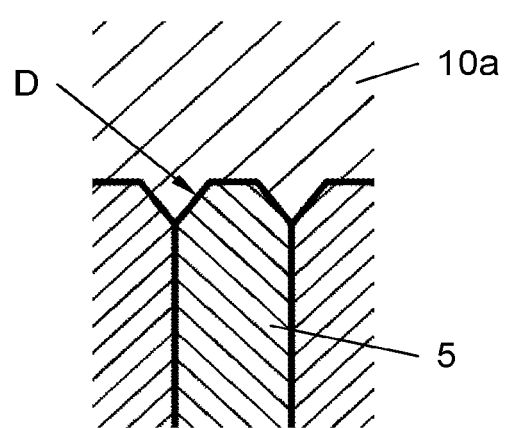
FIG. 13 shows a detailed view of the outer edges of the stator laminates.

It should be noted at this point that the molten aluminium may also penetrate to a certain depth between the stator laminates 5, 5a, 5b, as a result of which the form fit between the stator laminated core 6 and the housing part 10a . . . 10c is further improved. This effect occurs especially when the outer edges of the stator laminates 5, 5a, 5b are rounded or bevelled. FIG. 13 shows a greatly enlarged detail of the housing part 10a in which the penetration of the molten aluminium between the stator laminates 5, 5a, 5b in the region of the bevelled edges D can be seen.

The outer edges of the stator laminates 5, 5a, 5b are advantageously kept rather rough such that they have a sort of microserration. For example, such microserration can be achieved by stamping burrs not being removed or not being provoked at all. If the stator laminates 5, 5a, 5b are laser or plasma cut, such serration can be achieved by corresponding activation of the laser or plasma beam. The stator laminates 5, 5a, 5b are then sort of toothed wheels with very fine serrations. It would, for example, also be conceivable to knurl the stator laminated core 6.

Figure 14:
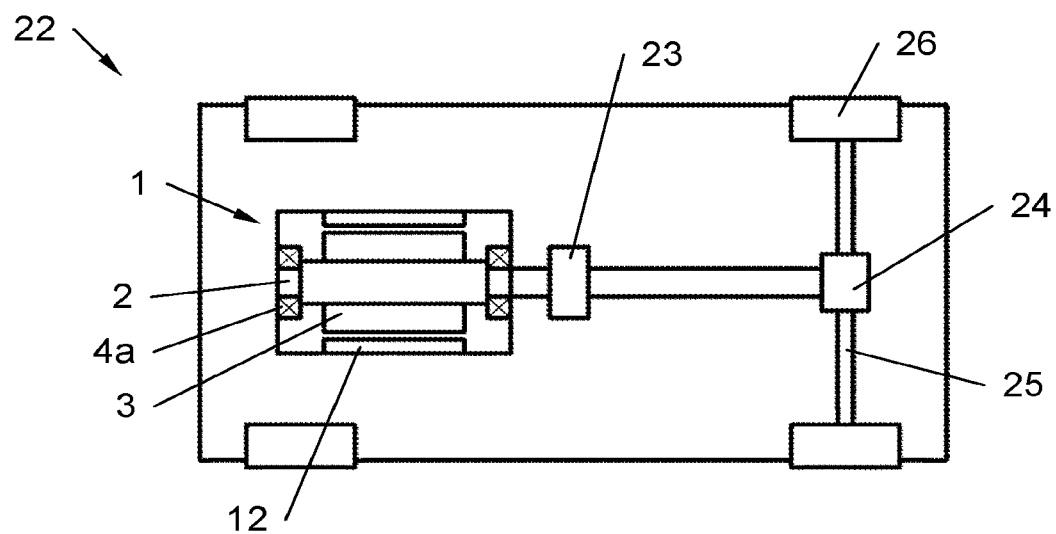
FIG. 14 shows an electrical machine with an intermediate product of the proposed type which is installed in a vehicle.

FIG. 14 finally shows the electrical machine 1 installed in a vehicle 22. The vehicle 22 has at least two axles, at least one of which is driven. Specifically, the electric motor 1 is connected to an optional transmission 23 and a differential gear 24. The half-shafts 25 of the rear axle are joined to the differential gear 24. Finally, the driven wheels 26 are mounted on the half-shafts 25. Driving of the vehicle 22 is performed at least partially or for part of the time by the electrical machine 1. This means that the electrical machine 1 may serve for solely driving the vehicle 22, or for example may be provided in conjunction with an internal combustion engine (hybrid drive).

In conclusion, it is established that the scope of protection is determined by the patent claims. The description and the drawings should, however, be used to interpret the claims. The features contained in the figures may be interchanged and combined with one another in an arbitrary fashion. In particular, it is also established that the devices illustrated may in reality also comprise more or alternatively fewer component parts than illustrated. In some cases, the illustrated devices or their component parts may also not be illustrated to scale and/or may be increased in size and/or reduced in size.

The invention claimed is:

1. A method for producing an intermediate product for an electrical machine, comprising:
   supplying a mould for a housing part, the mould including a first mould part and a second mould part, an upper part of the first mould part including a cavity delimited a first horizontal surface, a second horizontal surface, and a vertical surface connecting the first and second horizontal surfaces and including a first recess, and the second mould part including a vertical surface including a second recess;
   laying a stator laminated core inside the cavity of the first mould part such that the stator laminated core abuts the first horizontal surface and is vertically spaced apart from the second horizontal surface;
   moving the second mould part towards the first mould part so as to close the mould, the closed mould including a space above the stator laminated core delimited by the first recess, a portion of the vertical wall of the first mould part, the second horizontal wall, a portion of the vertical wall of the second mould part, and the second recess; and
   producing the housing part by introducing a molten metal alloy into the space of the closed mould,
   wherein the molten metal alloy comes directly into contact with the stator laminated core,
   wherein the metal alloy is a magnesium alloy or an aluminium alloy,
   wherein the stator laminated core comes directly into contact with the molten metal alloy only at a circumference.

2. The method according to claim 1, wherein the stator laminated core comes directly into contact with the molten metal alloy at the the circumference, and
   a) at an annular region of a first covering surface of the stator laminated core which is formed by a first stator laminate of the stator laminated core, or
   b) at an annular region of a first covering surface of the stator laminated core which is formed by a first stator laminate of the stator laminated core and additionally at an annular region of a second covering surface of the stator laminated core which is formed by a last stator laminate of the stator laminated core.

3. The method according to claim 1, wherein at least one of a circumferential deviation of the stator laminated core from an ideal cylindrical shape and a circumferential surface roughness of the stator laminated core is at least 0.1 mm.

4. The method according to claim 1, wherein the molten metal alloy penetrates between the stator laminates of the stator laminated core.

5. The method according to claim 4, wherein outer edges of the stator laminates of the stator laminated core are rounded or bevelled.

6. The method according to claim 1, wherein the stator laminated core has a temperature of between 15°–25° C., or is heated to a temperature of 50°–200° C., before the molten metal alloy is introduced into the mould.

7. An electrical machine, comprising:
   a housing with a housing part,
   a stator, arranged in the housing, with a stator laminated core, and
   a rotor which is arranged in the housing and is rotatably mounted therein,
   wherein
   the intermediate product produced according to claim 1 is part of the said housing and part of the said stator, wherein the stator laminated core is cast with the housing part.

8. A vehicle with at least two axles, at least of which one is driven by the electrical machine according to claim 7.

9. The method according to claim 1, wherein the metal alloy is an aluminium alloy having a minimum content of 2% Si and/or 1% Mg.

* * * * *